(12) United States Patent
Herz (10) Patent No.: US 7,210,497 B2
(45) Date of Patent: May 1, 2007

(54) PRESSURE RELIEF DEVICE WITH INCREASED FLOW RATE

(75) Inventor: Joshua J. Herz, Rochester, NY (US)

(73) Assignee: Qualitrol Corporation, Fairport, NY (US)

( * ) Notice: Subject to any disclaimer, the term of this patent is extended or adjusted under 35 U.S.C. 154(b) by 391 days.

(21) Appl. No.: 10/741,566

(22) Filed: Dec. 19, 2003

(65) Prior Publication Data

US 2005/0133093 A1    Jun. 23, 2005

(51) Int. Cl.
*F16K 17/30* (2006.01)
*H01F 27/14* (2006.01)

(52) U.S. Cl. ............... 137/469; 137/516.27; 137/382; 137/554; 174/11 R (58) Field of Classification Search ............... 137/469, 137/516.25, 516.27, 516.29, 382, 554, 559; 174/11 R, 17 VA
See application file for complete search history.

(56) References Cited

U.S. PATENT DOCUMENTS

| | | | |
|---|---|---|---|
| 2,904,616 A | * | 9/1959 | Koepke et al. ........... 174/11 R |
| 3,100,502 A | * | 8/1963 | Ford et al. ................. 137/469 |
| 3,131,718 A | * | 5/1964 | Mingrone .............. 137/516.29 |
| 3,189,675 A | * | 6/1965 | Moore et al. .............. 174/11 R |
| 3,217,082 A | * | 11/1965 | King et al. ................ 174/11 R |
| 3,914,528 A | * | 10/1975 | Johnson .................... 174/11 R |
| 4,074,096 A | | 2/1978 | Romanowski |
| 4,676,266 A | | 6/1987 | Johnson |
| 4,823,224 A | | 4/1989 | Hagerman et al. |
| 4,843,187 A | | 6/1989 | Johnson |
| 5,520,209 A | * | 5/1996 | Goins et al. ................ 137/469 |
| 5,937,893 A | | 8/1999 | Herz |
| 6,497,248 B2 | | 12/2002 | Herz |

* cited by examiner

*Primary Examiner*—John Rivell
(74) *Attorney, Agent, or Firm*—Harter Secrest & Emery LLP; Stephen B. Salai, Esq.; Michael J. Didas, Esq.

(57) ABSTRACT

A pressure relief device for electrical equipment housing, includes a valve body having a pedestal that projects above a mounting flange and a table on the pedestal that supports a two-stage valve assembly that can be sized in diameter independently of the working area of the flange beneath the table. The design is particularly applicable to retrofit applications for large power distribution equipment with the footprint of the pressure relief device fixed by the design of the equipment housings. The first-stage valve opening can be sized substantially as large as vent openings in the housings and the second-stage valve openings can be sized in the desired relationship with the first-stage opening for optimizing valve performance independently of the constraints imposed by the footprint of the device.

28 Claims, 4 Drawing Sheets

PRESSURE RELIEF DEVICE WITH INCREASED FLOW RATE

BACKGROUND OF THE INVENTION

1. Field of the Invention

The invention relates generally to pressure relief devices for large, power distribution equipment such as transformers and switches of the type that are filled with a dielectric oil or the like and which, when a fault occurs, are subject to damage caused by increased pressure.

2. Description of Related Art

Pressure relief devices, commonly referred to as PRDs, must quickly relieve the increased pressure that can accumulate in housings containing such electrical distribution equipment by allowing large quantities of potentially very hot fluids to escape from the housings in a short time. The devices must respond before the housings in which the equipment is contained rupture and in so responding allow a sufficient amount of fluid to be discharged in a sufficiently short amount of time to prevent damage, all while, preferably, discharging the fluid in a manner where it will not cause injury or damage to persons or equipment located close by.

Typically, pressure relief devices of type to which this invention is addressed have a two-stage operating characteristic. When the pressure in the housing increases to a predetermined threshold level requiring relief, a first valve opens. The release of pressure through the first valve opens a second interconnected valve, which has the effect of further opening the first valve to discharge fluid from the housing at a higher rate. The second valve, which operates once the first valve is opened, itself opens at a lower pressure than required to open the first valve. The lower pressure operating characteristic of the second valve together with its physical association with the first valve enables the second valve to open the first valve wider and to maintain the first valve open for a longer period of time until the pressure in the housing is well below the threshold required for opening the first valve.

One way in which this is accomplished is to provide two different size valve openings, a first-stage internal valve opening associated with a first seal circumscribing a first area and a second-stage external valve opening associated with a second seal circumscribing a second larger area. The first-stage internal valve opening is formed by an exit opening through a tubular collar aligned with a vent opening in the housing. The second-stage external valve opening is formed on a peripheral surface of the tubular collar. A preloaded poppet in the form of a disk engages both seals. An endface of the valve disk engages the first seal with a preload force produced by a compression spring. A depending skirt of the valve disk engages the second seal with a sliding fit. When the product of the pressure in the housing times the first area exceeds the preload force exerted by the compression spring on the valve disk, the valve disk is displaced for opening the first valve. Once the first valve is opened, an enlarged area of the valve disk corresponding to the second area is exposed to the pressure in the housing. The force generated by the product of the housing pressure times the second area is larger than the product of the housing pressure times the first area by a ratio of the two areas, which is typically around 2 to 1. The larger force further displaces the valve disk for opening the second valve and for opening the first valve even wider. Both valves are opened widely and quickly because the force generated by the application of housing pressure over the larger second area of the second valve greatly exceeds (such as by a factor of two) the preload force imparted by the compression spring at the closed positions of the valves.

PRDs are mounted onto the electrical housings using mounting flanges that are adapted by convention to fit a pattern of bolts surrounding the vent openings in the housings. The arrangement of such bolts is more or less standardized in the industry and imposes a limitation on the configuration of the PRD, which has, as will be described below, restricted the rate at which fluid may flow through the PRD.

The mounting flange has an annular working area that provides clearance for bolting the mounting flange to the housing. The working area is defined between effective inner and outer diameters that ensure a minimum clearance for bolting the mounting flange to the housing. The tubular collar, which has an inner diameter set by the first-stage internal valve opening and an outer diameter set by the second-stage external valve opening, projects from the flange within the inner diameter of the working area. Thus, the inner diameter of the working area of the flange determines the maximum size of the outer diameter of the tubular collar and the second-stage external valve opening. The first-stage internal valve opening is required to be proportionally smaller in diameter to provide the difference between the first and second areas required for the desired two-stage operation. It is the size of the first area that determines the maximum discharge rate through the PRD, and the limitations imposed upon this first area by the combination of (a) the inner diameter of the working area of the flange and (b) the further diametrical reduction required for two-stage operation significantly restricts the maximum flow rate through the PRD.

Figure 1:
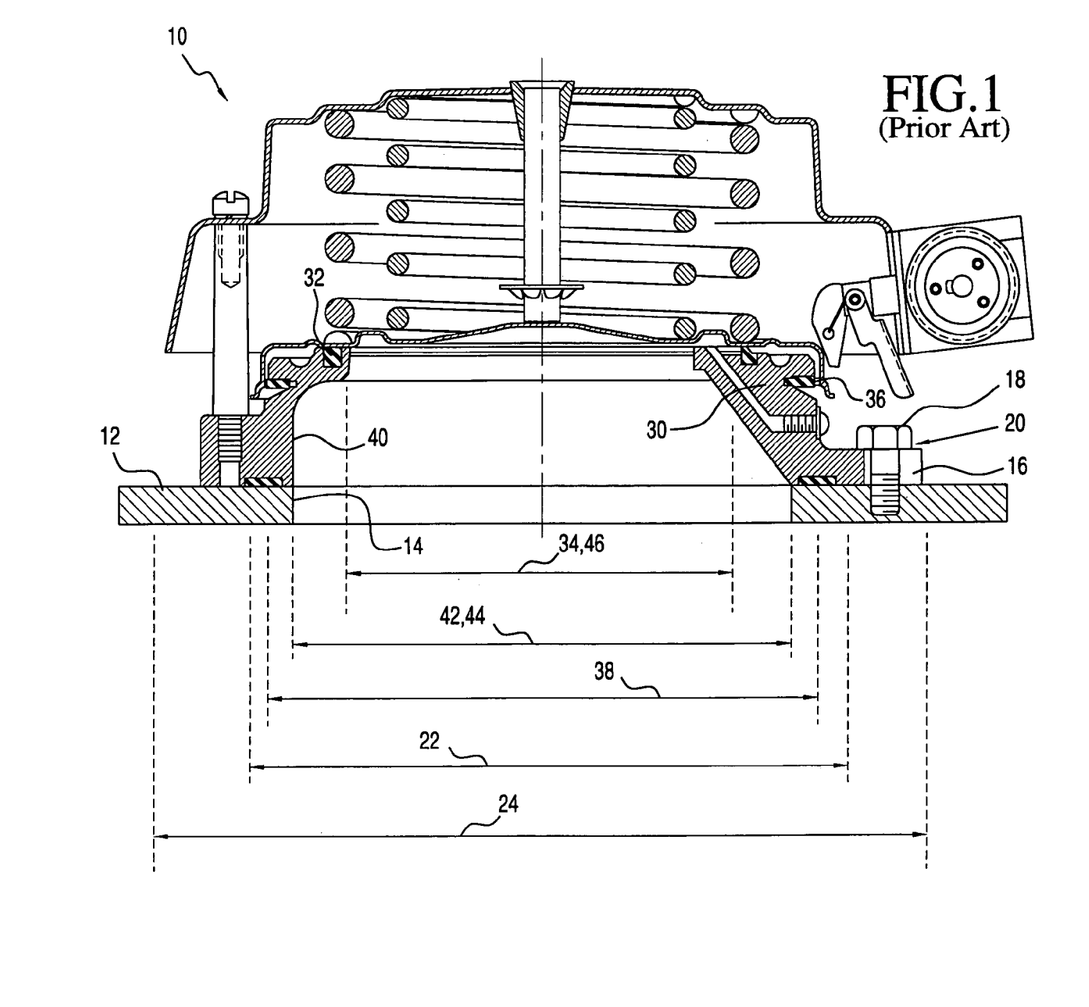
FIG. 1 is a transverse cross-sectional view of a conventional pressure relief device for electrical equipment housings.
Figure 2:
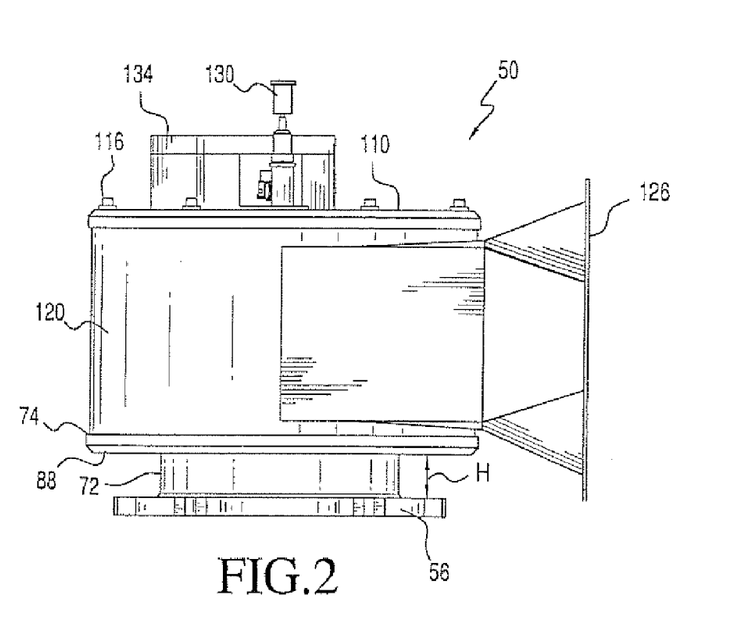
FIG. 2 is a side view of my new pressure relief device with a shield for directing the discharge of fluid from the device.
Figure 3:
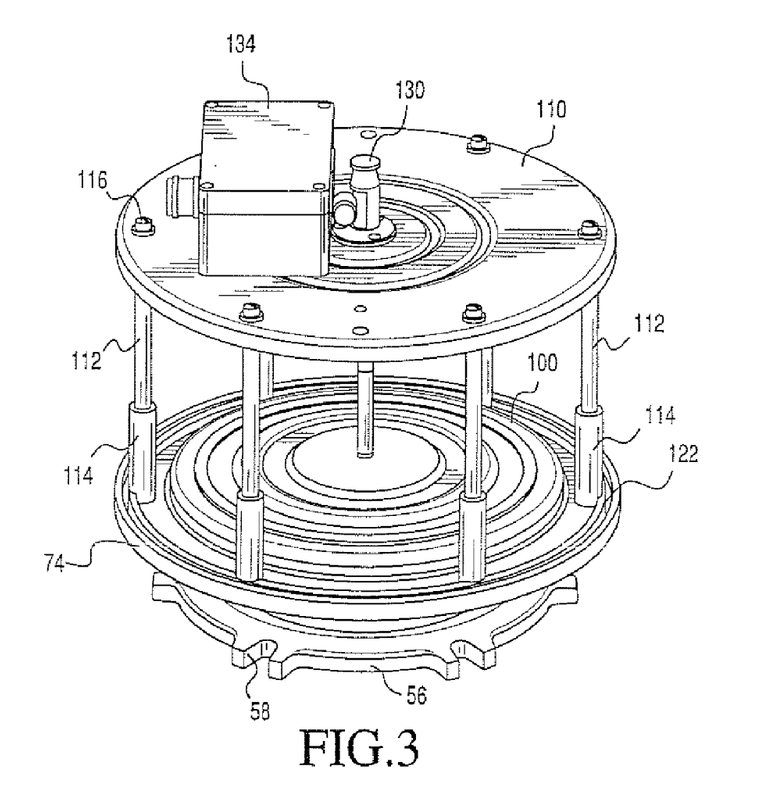
FIG. 3 is a perspective view of my new pressure relief device with the shield removed showing internal supporting structures spanning a gap between a table and a lid along with a view of a valve poppet seated in a closed position on the table.
Figure 4:
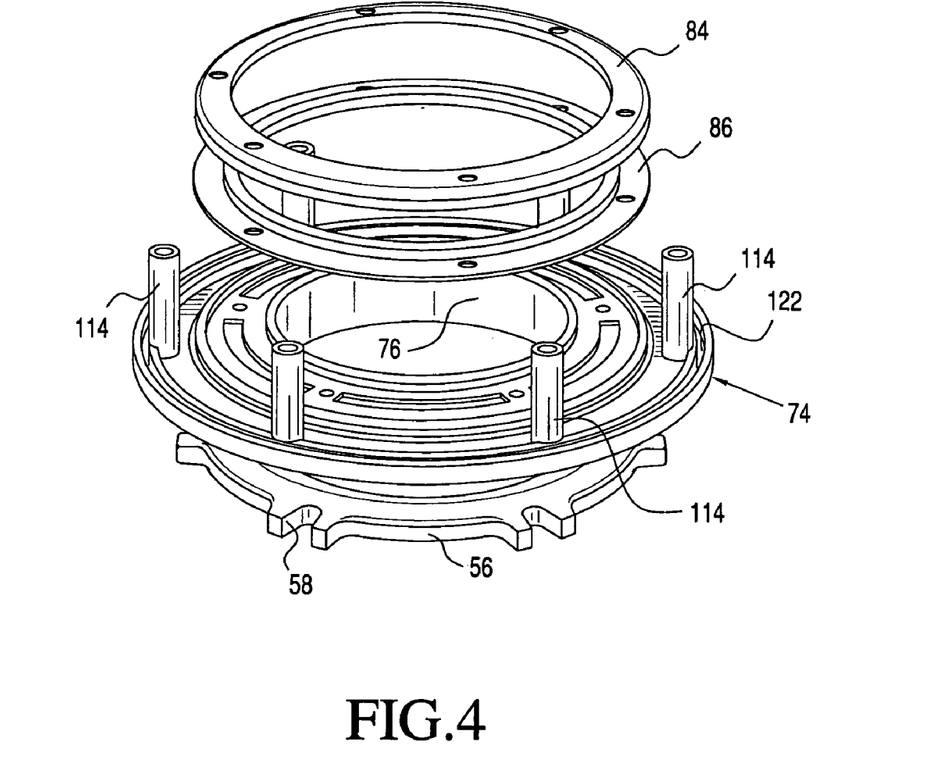
FIG. 4 is an exploded perspective view of the table showing internal structures including a throat along with two valve seal mounting rings.

An example of a PRD representative of current designs is shown in FIG. 1. The illustrated PRD 10 is mounted over a vent opening 14 in an electrical equipment housing 12 with a flange 16 that is secured to the housing 12 by a circle of bolts 18. The flange 16 has an annular working area 20 defined between inner and outer diameters 22 and 24 occupied by the bolts 18 and any washers or other fastening elements required to attach the flange 16 to the housing 12. A tubular collar 30 formed integrally with the flange 16 has a first-stage internal valve opening 32 near an innermost diameter 34 of the tubular collar 30 and a larger second-stage external valve opening 36 on an outermost diameter 38 of the tubular collar 30. The outermost diameter 38 of the tubular collar 30, which includes the second-stage external valve opening 36, is located within (i.e., is smaller than) the inner diameter 22 of the working area 20 of the flange 16 for preserving the clearance required for mounting the PRD 10 on the housing 12 using the conventional bolt pattern. The innermost diameter 34 of the tubular collar 30 is constricted by the first-stage internal valve opening 32 that is necessarily proportionally smaller than the second-stage external valve opening 36 to support the desired two-stage operation. Flow rates through the PRD 10 are limited by the first-stage internal valve opening 32 that constricts the innermost diameter 34 of the tubular collar 30.

Within the tubular collar 30 is a throat 40 having an entrance adjacent to the vent opening 14 in the housing 12 and an exit adjacent to the first-stage internal valve opening 32. At its entrance, the throat diameter 42 is as least as large as the diameter 44 of the vent opening 14 and is limited only by the inner diameter 22 of the working area 20 of the flange 16 and the thickness of the tubular collar 30. At its exit, the throat diameter 46, which corresponds to the innermost diameter 34 of the tubular collar 30, is significantly smaller than the diameter 44 of the vent opening 14 in the housing 12 and is limited by the size of the first-stage internal valve opening 32. Potential flow rates through the tubular collar 30 are reduced by the difference between the entrance and exit diameters 42 and 46 of the throat 40 or at least by the difference between the diameter 44 of the vent opening 14 in the housing and the limited exit diameter 46 of the throat 40 (i.e., the innermost diameter of the tubular collar 30).

Although conventional PRDs have, for many years, provided effective pressure relief operations for electrical equipment housings, it can be readily be appreciated by reference to FIG. 1 that the size of the first-stage internal valve opening 32 imposes a limit on the rate at which fluid may flow through the pressure relief device and that this limit is lower than the limit imposed by the size of the vent opening 14 in the housing 12. Accordingly, to achieve higher flow rates commensurate with the size of the vent openings in electrical equipment housings, larger size PRDs have been required, which involve expensive changes to the electrical housings to accept pressure relief devices having larger footprints (i.e., flange diameters). High costs generally make such retrofits prohibitively expensive.

BRIEF SUMMARY OF THE INVENTION

My invention increases flow rates through two-stage pressure relief devices (PRDs) of a type that can be used to relieve pressure in electrical equipment housings without increasing the footprint required to mount the devices on the housings. One or more embodiments of the invention provide improved pressure relief devices (PRDs) that achieve higher flow rates commensurate with the size of the vent openings in electrical equipment housings. Preferably, these new PRDs do not further restrict the flow of fluids from the housings any more than the restriction imposed by the size of the vent openings in the housings themselves.

A PRD in accordance with the invention can have a first-stage internal valve opening that is substantially the same size as the vent opening in a conventional electrical housing and a second-stage external valve opening that overlaps the working area of the mounting flange without interfering with the attachment of the flange to the electrical housing using a conventional circle of bolts. The first and second-stage openings remain at a size ratio (e.g., 2 to 1) required to support the desired two-stage operation for rapidly discharging fluids from the housing at higher flow rates. Thus, the second-stage external valve opening is no longer limited by the working area of the mounting flange, and the first-stage internal valve opening can be sized to exploit the entire diameter of the vent opening in the electrical housing. Together, these two changes enable a 50% or higher increase in flow rates through the new PRDs.

One example of a new PRD for mounting on an electrical equipment housing over a vent opening includes a multiple stage valve having a valve body with a throat alignable with the vent opening for discharging fluid from the housing. A flange supports the valve body for mounting the valve body on the housing over the vent opening. The flange has a working area adapted to receive fastening elements for attaching the flange to the housing. A pedestal formed in the valve body adjacent to the flange has a height that extends the valve body along the throat. A table formed in the valve body on the pedestal has a perimeter that extends the valve body around the throat overhanging the working area of the flange. The table supports the larger of two valve openings on a portion of the table that overhangs the working area of the flange so that both valve openings can be sized independently of the working area of the flange for optimizing flow rates through the valve. The height of the pedestal provides clearance between the overhanging portion of the table and the working area of the flange sufficient to avoid interfering with the receipt of the fastening elements for attaching the flange to the housing.

Preferably, the flange has an annular working area between inner and outer diameters circumscribing the intended location of the fastening elements for attaching the flange to the housing. One of the two valve openings is preferably a first-stage valve opening formed on the valve body for regulating the discharge of fluid from the throat of the valve body, and the other of the two valve openings is preferably a second-stage valve opening formed on the valve body for regulating the discharge of fluid from the first-stage valve opening. The second-stage valve opening has an effective diameter that is larger than an effective diameter of the first-stage valve opening in accordance with a predetermined ratio. The larger second-stage valve opening, which is supported on the table, is spaced apart from the flange along the throat of the valve body by the pedestal. The effective diameter the second-stage valve opening exceeds the inner diameter of the working area of the flange for enabling the effective diameter of the first-stage valve to be optimized for discharging fluid from the housing. The spacing of the second-stage valve opening from the flange provides clearance along the valve body to access the intended location of the fastening elements for attaching the flange to the housing.

The pedestal that connects the flange to the table portion of the valve body preferably has an outer diameter that is within the inner diameter of the working area. In conventional valves, it was the outer diameter of the valve body in this region that set the maximum diameter of the second-stage valve opening. However, in accordance with the invention, the pedestal portion of the valve body provides support for locating the second-stage valve opening on a table portion of the valve body displaced along the throat of the valve body to preserve the required clearance in the vicinity of the working area of the flange while enabling the diameter of the second-stage valve opening to be sized larger than the inner diameter of the working area.

The table portion of the valve body preferably includes a collar that supports first and second seals that circumscribe the first and second-stage valve openings. The first seal associated with the first-stage valve opening circumscribes an internal valve opening through the collar formed at the intersection of the throat and the collar on the top surface of the table. The second seal associated with the second-stage valve opening circumscribes an external valve opening formed on a peripheral surface of the collar. Both seals are engaged by a preloaded poppet having a disc face for engaging the first seal and a depending skirt for engaging the second seal. The first-stage seal is preferably an axial seal that is compressed by an axial biasing force applied by the poppet. The second-stage seal is preferably a peripheral seal that has a wiper-blade type engagement with a peripheral rim of the poppet. A predetermined range of poppet motion is required to disengage or open the second-stage seal. The purpose of the second-stage seal is not to confine fluid within the electrical equipment housing, but to provide for more rapidly and widely opening the poppet once the threshold pressure for opening the first-stage seal has been reached.

Preferably, the poppet is preloaded by a compression spring that biases the poppet into engagement with both seals. The table also preferably includes posts or other axial supports for mounting a lid that compresses the compression spring for forcing the valve poppet into engagement with the two seals. The height of the posts is set to maintain a predetermined separation between the table and the lid associated with a desired preload of the compression spring. Since the supports project above the table, the supports do not interfere with the working area of the flange.

For collecting and directing fluids discharged from the two-stage valve, the table together with the lid is also preferably adapted to capture a peripheral shield surrounding the two-stage valve. The peripheral shield encloses the space between the table and the lid and includes a mounting for a discharge pipe to direct high volume flows safely from the pressure relief device. Preferably, the peripheral shield is captured between the table and the lid so that it remains rotatable in the direction of its periphery to accommodate differing orientations of the discharge pipe. Although it is possible to clamp the shield in a fixed position after being adjusted in place, it is preferred that the lid be fixed to the table at a predetermined spacing to set the desired compression of the compression spring independently of the rotational adjustment of the peripheral shield. In other words, the lid is preferably firmly attached to the table for compressing the compression spring without limiting rotation of the shield with respect to the table or lid. Setscrews or other fasteners can be used to hold the shield in a fixed position. For attaching the lid, the table preferably includes integral bosses that support mounting posts projecting above the table. The lid can be bolted to the mounting posts. The height of the mounting posts can be used to regulate the compression of the compression spring.

In a typical retrofit application for my new PRD, a conventional electrical equipment housing has a vent opening surrounded by a bolt circle having a standard diameter and spacing between the bolts. My PRD has a mounting flange with bolt receiving features aligned with the standard bolt circle for mounting the PRD over the vent opening. The receiving features define a working area of the flange that receives the bolts together with their washers for attaching the flange to the conventional electrical equipment housing. Since the working area must be kept clear for bolting the flange in place, prior two-stage PRDs have had limited size valve openings with diameters no greater then the inner diameter of the working area.

DETAILED DESCRIPTION OF THE INVENTION

The drawing figures, FIGS. 2–6, illustrate a preferred embodiment of the invention including features of the design that enable my pressure relief device to accommodate much larger flow rates through a conventional mounting footprint unchanged in size. The new pressure relieve device (PRD) 50 mounts atop an electrical equipment housing 52 over a vent opening 54 in the housing 52. A flange 56 having conventional dimensions includes a number of slotted openings 58 for receiving bolts 60 arranged in a conventional pattern (referred to as a bolt circle). The bolts 60 extend through the slotted openings 58 into threaded engagement with the housing 52 for securing the PRD 50 to the housing 52. The bolts 60 also engage a working area 62 of the flange 56, which is defined as an annular space required for attaching the flange 56 to the housing 52.

Figure 5:
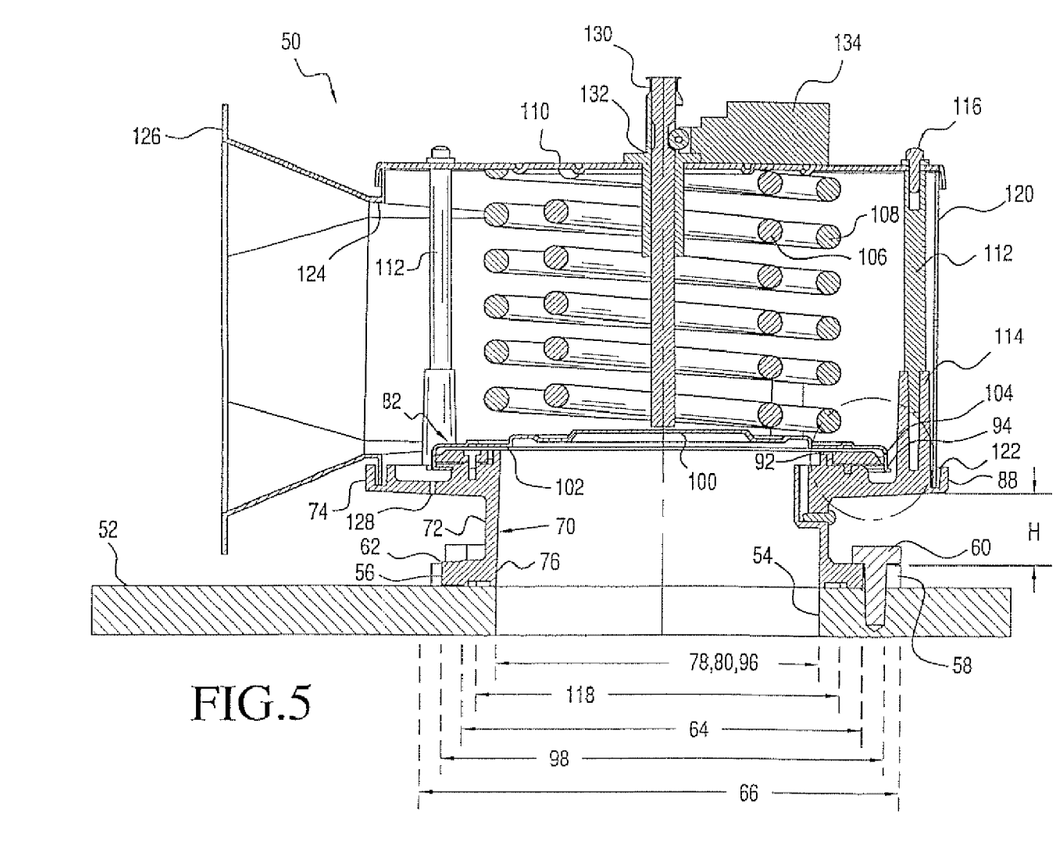
FIG. 5 is a transverse cross-sectional view showing the inner workings of the pressure relief device.

As shown more clearly in FIG. 5, the working area 62 of the flange 56 has an inner diameter 64 just inside the circle of bolts 60 and an outer diameter 66 that lies just beyond the circle of bolts 60. Although the illustrated design shows the flange 56 attached to the housing using only the bolts 60 as fastening elements, the working area 62 of the flange 56 can also be arranged to receive washers or other elements that are useful for attaching the flange 56 to the housing 52.

Preferably, the flange 56 is formed as an integral part of a valve body 70 that includes a pedestal 72 projecting above the flange and a table 74 that sets on the pedestal 72 overhanging the flange 56. The pedestal 72 has a generally tubular form and shares a common throat 76 with both the flange 56 and the table 74. The throat 76 has a substantially constant diameter 78 along its length between the flange 56 and the table 74, which is preferably as large as a diameter 80 of the vent opening 54. It is the throat 76 that provides the passage through the pressure relief device 50 for relieving excess pressure in the housing 52. Since the throat diameter 78 is substantially the same size as the diameter 80 of the vent opening 54, the pressure relief device 50 provides for accommodating maximum flow rates from the housing 52.

The table 74 supports a two-stage valve assembly 82 that can be sized independently of the dimensions of the working area 62 of the flange 56. Annular mounting collars 84 and 86, seen best in the enlarged view of FIG. 4, secure first and second-stage seals 92 and 94 of the two-stage valve assembly 84 to the table 74. The two seals 92 and 94 can be formed at opposite ends of a common seal body 90 as shown, or the two seals 92 and 94 can be separately formed of the same or different material. Preferably, the two seals 92 and 94 are formed of nitrile or fluorocarbon elastomers, which are compatible with a large variety of oils. Additional information about such seals and other details of two-stage valve assemblies for pressure relief devices are disclosed in co-assigned U.S. Pat. No. 6,497,248 entitled Pressure Relief Device with One Piece Gasket, which is hereby incorporated by reference.

Figure 6:
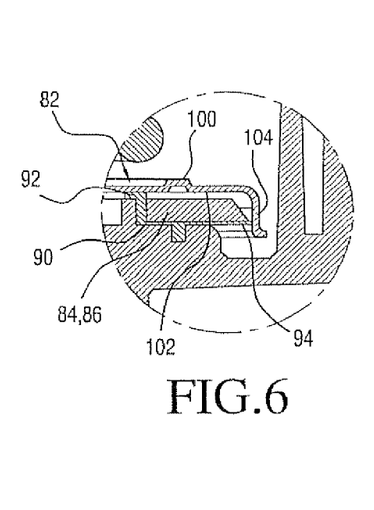
FIG. 6 is an enlarged cutaway view showing the seals that support a two-stage valve operation.

The first-stage seal 92 defines a first-stage internal valve opening having an effective diameter 96 and the second-stage seal 94 defines a second-stage external valve opening having an effective diameter 98, both of which are closed by a spring-biased poppet 100. A disc face 102 of the poppet 100 engages the first-stage seal 92 for closing the first-stage internal valve opening and a surrounding depending skirt 104 of the poppet 100 engages the second-stage seal 94 for closing the second-stage external valve opening. The disc face 102 of the poppet 100 positively seats against the first-stage seal 92 with a compression fit that blocks flows of fluid through the throat 76. The depending skirt 104 of the poppet 100 engages the second-stage seal 94 with a sliding fit. The second-stage seal 94, which is shaped as a wiper blade, accommodates a small range of axial motion of the depending skirt 104 while maintaining a sealed engagement.

The poppet 100 is biased into engagement with both seals 92, 94 by a pair compression springs 106, 108 that are confined between the poppet 100 and a lid 110. Mounting posts 112 support the lid 110 above the table 74. The mounting posts 112 project from bosses 114 that are evenly spaced around the table 74. Bolts 116 fasten the lid 110 to the posts 112 for compressing the compression springs 106, 108 within a predetermined spacing between the table 74 and the lid 110. The amount of spring compression sets a threshold pressure required for lifting the poppet 100 and opening the two-stage valve assembly 82. Although in the illustrated embodiment two compression springs 106, 108 are shown, a single compression spring or other biasing device can be used to set the threshold pressure required for lifting the poppet 100 depending upon the desired force profile. The effective diameter 96 of the first-stage seal 92 defines a first area over which fluid pressure is effective for lifting the poppet 100 from the first-stage seal 92. The effective diameter 98 of the second-stage seal 94 defines a second area over which fluid escaping through the first-stage internal valve opening is effective for lifting the poppet 100 from the second-stage seal 94. The second area of the second-stage seal 94 is preferably larger than the first area of the first-stage seal 92 by a ratio of approximately 2 to 1 to provide for rapidly lifting the poppet 100 to release pressure accumulated within the housing 52. Although area ratios of approximately 2 to 1 are typical for such two-stage valve assemblies, other ratios can be used for adjusting the rate and height at which the poppet 100 is lifted from the first and second stage seals 92, 94. For example, ratios varying from 1.5 to 1 to 3 to 1 are within a range of normal expectations covering a usual range of conditions.

In contrast to prior designs in which the effective diameters of the first and second-stage seals are limited by the dimensions of the working area of the flange, my new design permits the effective diameters 94 and 96 of the first and second-stage valve openings to be sized as desired for optimizing the discharge of fluid from the housing 52. That is, instead of maintaining a radial clearance between the two stage valve assembly and the working area 62 of the flange 56, my new design supports the two stage valve assembly 82 on the table 74, which is axially offset from the flange 56. The pedestal 72 supports an overhung portion 88 of the table 74 at a height "H" above the working area 62 of the flange 56. The height "H" provides sufficient clearance for inserting and securing the bolts 60 through the flange 56.

The effective diameter 96 of the first-stage valve opening can be sized just as large as the diameter 80 of the vent opening 54 to avoid a further restriction of fluid flows from the housing 54. The effective diameter 98 of the second-stage valve opening can be sized in a desired ratio with the effective diameter 96 of the first-stage valve opening without regard to the limitations previously imposed by the working area 62 of the flange 56. In the illustrated embodiment, the effective diameter 98 of the second-stage valve opening exceeds the inner diameter 64 of the working area 62 of the flange 56. However, the effective diameter 98 of the second-stage valve opening can also exceed the outer diameter 66 of the flange working area 62.

The second-stage seal 94 is supported on the portion 88 of the table 74 that overhangs the working area 62 of the flange 56. Thus, although radially overlapping at least part of the working area 62 of the flange 56, the second-stage seal 94 is axially offset from the working area 62 of the flange 56 by the pedestal 72, which raises the table 74 above the flange 56. The pedestal 72 extends the valve body 70 along with the throat 76 to the first stage seal 92. Preferably, the throat diameter 78 is maintained throughout its length at a size comparable to the diameter 80 of the vent opening 54 in the housing 52.

Although the pedestal 72 has a diameter 118 adjacent to the flange 56 that is limited by the inner diameter 64 of the working area 62 of the flange 56, the table 74 that sits upon the pedestal 72 can be dimensioned in diameter independently of the working area 62 of the flange 56. For example, beyond the two-stage valve assembly 82, the table 74 supports the mounting posts 112 from the bosses 114. Although the bosses 114 are shown projecting well above the table 74, the bosses can be constructed at different sizes and shapes such as bosses providing threaded openings substantially flush with the top of the table 74. Alternatively, the mounting posts 112 could be connected directly to the table 74 such as by forming threaded openings in a surface of the table 74. Beyond even the bosses 114, the table 74 supports a peripheral shield 120.

The peripheral shield 120 encloses a space between the table 74 and the lid 110 surrounding the two stage valve assembly 82. An annular slot 122 formed in the table 74 positions the peripheral shield in place on the table. A combination of radial clearance within the annular slot 122 and axial clearance between the lid 110 and the table 74 as set by the mounting posts 112 allows the peripheral shield 120 to rotate around the annular slot 122 until deliberately secured in place by a set screw or other securing mechanism. Thus, while the lid 110 together with the table 74 can be arranged to constrain the peripheral shield 120 both axially and radially, the peripheral shield 120 is not mounted under any tension or compression that would limit its ability to rotate in the annular slot 122 until deliberately secured in place by a set screw or other securing mechanism. An opening 124 surrounded by pipe fitting 126 is provided in one side of the peripheral shield 120 for connecting the shield 120 to a discharge pipe (not shown). The peripheral shield 120 is rotatable together with the fitting 126 for accommodating different angular orientations of the discharge pipe. Although the fitting 126 is depicted as a flange in the drawing FIGS. 2 and 5, the fitting can take a variety of other forms for making the desired connection. For example, a simple sliding flit between the peripheral shield and a discharge pipe is sufficient for some applications.

The peripheral shield 120, together with the table 74 and the lid 110, collects fluid discharged under pressure from the housing 52 and directs the collected fluid to the discharge pipe where the fluid can be conveyed from the pressure relief device 50. Openings 128 in the overhung portion 88 of the table 74 provide for draining fluid beneath the level of the discharge pipe. Further details regarding the construction and operation of peripheral shield assemblies are disclosed in co-assigned U.S. Pat. No. 5,937,893 entitled Shield for Pressure Relief Device, and co-assigned U.S. patent application for an Enclosure System for Pressure Relief Device filed in my name on even date herewith, which are both hereby incorporated by reference.

Guided by a bushing 132 in the lid 110 is an indicator pin 130 that rests on the poppet 100. Displacement of the poppet 100 elevates the pin 130 through the lid 120 producing a visible indication that the pressure relief device 50 has been operated. A friction fit with the bushing 132 holds the pin 130 in the elevated position until manually reset. An alarm switch assembly 134 can be connected to the pin 130 so that movement of the pin 130 actuates a remote alarm or signal device (not shown). The pin 130 and the bushing 132 can project at varying heights above the lid 110 in accordance with routine variations in the alarm/signaling system.

Although described with respect to a preferred embodiment, various modifications can be made particularly to the valve structures, their supports, and surrounding systems in keeping with the overall teaching of the invention for overcoming the limitations of the prior art.

The invention claimed is:

1. A pressure relief device for mounting on an electrical equipment housing over a vent opening for discharging pressurized fluid from the housing comprising:
   a multiple stage valve having a valve body with a throat alighnable with the vent opening for discharging fluid from the housing;
   a flange supporting the valve body for mounting the valve body on the housing over the vent opening;
   the flange having an annular working area between inner and outer diameters circumscribing the intended location of fastening elements for attaching the flange to the housing;
   a first-stage valve opening formed on the valve body for regulating the discharge of fluid from the throat of the valve body;
   a first-stage seal sealing the first-stage valve opening;
   a second-stage valve opening formed on the valve body for regulating the discharge of fluid from the first-stage valve opening;
   a second-stage seal sealing the second-stage valve opening;
   the second-stage valve opening having an effective diameter larger than an effective diameter of the first-stage valve opening by a predetermined ratio;
   the second-stage valve opening being spaced along the throat of the valve body from the flange;
   the effective diameter of the second-stage valve opening exceeding the inner diameter of the working area of the flange for enabling the effective diameter of the first-stage valve to be optimized for discharging fluid from the housing;
   fluid being discharged from the housing when a pressure applied by contents of the housing exceeds the pressure on a side of the first-stage seal opposite the housing, such that, in order, the first-stage seal becomes unseated, allowing flow of the fluid through the first-stage valve opening, and the second-stage seal becomes unseated, allowing flow of the fluid through the second-stage valve opening; and
   a spacing of the second-stage valve opening from the flange providing clearance along the valve body to access the intended location of the fastening elements for attaching the flange to the housing.

2. The device of claim 1 in which a pedestal is formed in the valve body adjacent to the flange and the pedestal has a height that extends the valve body along the throat.

3. The device of claim 2 in which a table is formed in the valve body on the pedestal and the table has an extended portion that overhangs the working area of the flange.

4. The device of claim 3 in which the table supports the second-stage valve opening on the extended portion of the table that overhangs the working area of the flange.

5. The device of claim 4 in which the height of the pedestal provides clearance between the overhanging portion of the table and the working area of the flange sufficient to avoid interfering with the receipt of the fastening elements for attaching the flange to the housing.

6. The device of claim 4 in which the table includes a collar that has an internal valve opening at an intersection of the throat and the collar as the first-stage valve opening and an external valve opening on a peripheral surface of the collar as the second-stage valve opening.

7. The pressure relief device of claim 1, wherein the second-stage seal is arranged in an axial direction between the first-stage seal and the housing.

8. A pressure relief device for mounting on an electrical equipment housing over a vent opening for discharging pressurized fluid from the housing comprising:
   a multiple stage valve having a valve body with a throat alignable with the vent opening for discharging fluid from the housing;
   a flange supporting the valve body for mounting the valve body on the housing over the vent opening;
   the flange having a working area adapted to receive fastening elements for attaching the flange to the housing;
   a pedestal formed in the valve body adjacent to the flange and having a height that extends the valve body along the throat;
   a table formed in the valve body on the pedestal and having an extended portion that overhangs the working area of the flange;
   the table supporting the larger of two valve openings on the extended portion of the table that overhangs the working area of the flange so that the valve openings can be sized independently of the working area of the flange for optimizing flow rates through the valve;
   first and second seals, one associated with each of the two valve openings, to close the two valve openings, the seal for closing the larger of the two valve openings being arranged between the smaller of the two valve openings and the housing in an axial direction; and
   the height of the pedestal providing clearance between the overhanging portion of the table and the working area of the flange sufficient to avoid interfering with the receipt of the fastening elements for attaching the flange to the housing.

9. The device of claim 8 in which the working area of the flange is an annular area between inner and outer diameters circumscribing the intended location of fastening elements for attaching the flange to the housing.

10. The device of claim 9 in which the larger of the two valve openings is spaced along the throat of the valve body from the flange and has an effective diameter that exceeds the inner diameter of the working area of the flange.

11. The device of claim 10 in which the spacing of the larger of the two valve openings from the flange exceeds the height of the pedestal to maintain clearance along the valve body to access the intended location of the fastening elements for attaching the flange to the housing.

12. The device of claim 11 in which the effective diameter of the larger of the two valve openings is larger that an effective diameter of the smaller of the two valve openings by a ratio of at least 2 to 1.

13. The device of claim 8 in which the table also supports the smaller of the two valve openings.

14. The device of claim 13 in which the table includes a collar that supports the first and second seals, the first seal circumscribing an internal valve opening through the collar formed at an intersection of the throat and the collar, and the second seal circumscribing an external valve opening on a peripheral surface of the collar.

15. The device of claim 14 in which both seals are engaged by a preloaded poppet.

16. The device of claim 10 in which the pedestal has an outer diameter that is smaller than the inner diameter of the working area of the flange.

17. The device of claim 8 in which the table includes posts for mounting a lid at a predetermined spacing from the table.

18. The device of claim 17 in which a compression spring is compressed between the lid and the table for biasing a poppet into a position for closing the two valve openings.

19. The device of claim 17 in which a peripheral shield is captured between the table and the lid.

20. The device of claim 19 in which the peripheral shield includes an opening for directing fluid discharges from the pressure relief device and is rotatable in the direction of its periphery with respect to the table and the lid.

21. A system for increasing flow rates through a pressure relief device attached to a conventional electrical equipment housing using standard size bolt circle surrounding vent openings in the housing comprising:
- a multistage valve assembly having a mounting flange with bolt receiving features aligned with the standard bolt circle for mounting the PRD over the vent opening of the conventional electrical equipment housing;
- the bolt receiving features occupying a working area of the flange that receives the bolts together with any washers or other associated fastening elements for attaching the flange to the conventional electrical equipment housing;
- a pedestal projecting from within the mounting flange adjacent to the working area of the mounting flange and having a throat aligned with the vent opening for conveying discharge fluid through the valve assembly;
- a table supported on the pedestal in communication with the throat having an extended portion that overlies the working area of the flange;
- first and second valve openings arranged in series for rapidly discharging fluid through the throat of the multistage valve assembly in response to a predetermined pressure in the conventional electrical equipment housing; and
- the table supporting at least the larger of the first and second valve openings on the extended portion that overlies the working area of the flange so that the valve openings can be sized independently of the working area of the flange for optimizing flow rates through the pressure relief device.

22. The system of claim 21 in which the smaller of the first and second valve openings is sized substantially as large as the vent opening to avoid a further restriction on the flow through the pressure relief device.

23. The system of claim 22 in which the larger of the first and second valve openings is sized at least as large as the bolt circle without interfering with the receipt of the bolts and any associated fastening elements for attaching the flange to the housing.

24. The system of claim 21 in which the smaller of the first and second valve openings is an internal valve opening formed at an intersection of the table and the throat, and the larger of the first and second valve openings is an external valve opening formed around a lateral surface of the table.

25. The system of claim 24 in which posts located beyond the lateral surface of the table connect a lid to the table at a predetermined spacing.

26. The system of claim 25 in which a peripheral shield is captured between the table and the lid.

27. The system of claim 26 in which the peripheral shield includes an opening for directing fluid discharges from the pressure relief device and is rotatable in the direction of its periphery with respect to the table and the lid.

28. The system of claim 26 in which a compression spring is compressed between the lid and the table for biasing a poppet into a position for closing the valve openings.

* * * * *